(12) United States Patent
Opfermann

(10) Patent No.: US 11,467,045 B2
(45) Date of Patent: Oct. 11, 2022

(54) CALIBRATION STRUCTURE FOR CALIBRATING A TEMPERATURE SENSOR AND METHODS THEREFORE

(71) Applicant: SIKA Dr. Siebert & Kühn GmbH & Co. KG, Kaufungen (DE)

(72) Inventor: Martin Opfermann, Guxhagen (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 332 days.

(21) Appl. No.: 16/726,424

(22) Filed: Dec. 24, 2019

(65) Prior Publication Data

US 2020/0209074 A1 Jul. 2, 2020

(30) Foreign Application Priority Data

Dec. 27, 2018 (DE) .......................... 102018133618.7

(51) Int. Cl.
*G01K 15/00* (2006.01)
*G01K 1/022* (2021.01)
*G08B 5/22* (2006.01)
*H04N 7/18* (2006.01)

(52) U.S. Cl.
CPC .......... *G01K 15/005* (2013.01); *G01K 1/022* (2013.01); *G08B 5/22* (2013.01); *H04N 7/18* (2013.01)

(58) Field of Classification Search
CPC ...... G01K 1/022; G01K 15/005; G01K 1/024; G01K 15/002; G01K 1/00; G01K 15/00; G01K 17/00; H04N 7/18

USPC .......................................................... 702/99
See application file for complete search history.

(56) References Cited

U.S. PATENT DOCUMENTS

| 5,109,277 A * | 4/1992 | James ..................... G01J 5/025 |
| | | 702/135 |
| 10,830,650 B2 * | 11/2020 | Friedrichs ............ G01K 15/005 |
| 10,983,014 B2 * | 4/2021 | Rumler .................. G01K 7/427 |

(Continued)

FOREIGN PATENT DOCUMENTS

| CN | 1158684 A * | 9/1997 | ............. H04N 17/04 |
| CN | 1158684 A * | 9/1997 | |

(Continued)

*Primary Examiner* — Gail Kaplan Verbitsky
(74) *Attorney, Agent, or Firm* — Dinsmore & Shohl LLP

(57) ABSTRACT

A calibration setup for calibrating a temperature sensor includes a temperature calibrator, a temperature measuring unit connected to the temperature sensor, a camera unit configured to detect a measured temperature value and to transmit the measured temperature value to a storage medium in the temperature calibrator. A method of calibrating a temperature sensor using the calibration setup includes heating the temperature sensor to a first calibration temperature; detecting a first temperature value by the camera unit; transmitting the first temperature value from the camera unit to a storage medium in the temperature calibrator; heating the temperature sensor to at least a second calibration temperature; detecting a second temperature value by the camera unit; transmitting the second temperature value from the camera unit to the storage medium; and displaying the detected and stored temperature values on a calibrator indicator display in a respective association with the calibration temperatures.

13 Claims, 3 Drawing Sheets

(56) References Cited

U.S. PATENT DOCUMENTS

| | | | | |
|---|---|---|---|---|
| 2009/0121033 A1* | 5/2009 | Sjogren | ................ | G01K 15/005 237/2 A |
| 2014/0314115 A1* | 10/2014 | Friedrichs | ............. | G06F 3/0488 374/1 |
| 2021/0385393 A1* | 12/2021 | Lee | ........................... | G01J 5/53 |

FOREIGN PATENT DOCUMENTS

| | | | | | |
|---|---|---|---|---|---|
| CN | 201548351 | U | | 8/2010 | |
| CN | 101949746 | A | | 1/2011 | |
| CN | 102118562 | A | * | 7/2011 | ............. G03B 17/02 |
| CN | 201897509 | U | | 7/2011 | |
| CN | 104880263 | A | | 9/2015 | |
| CN | 107687911 | A | | 2/2018 | |
| CN | 112402818 | A | * | 2/2021 | |
| CN | 212513408 | U | * | 2/2021 | |
| CN | 212513408 | U | * | 2/2021 | |
| CN | 111044171 | B | * | 11/2021 | ............. G01K 11/32 |
| DE | 10005213 | A1 | | 8/2001 | |
| DE | 20317566 | U1 | | 1/2004 | |
| DE | 102018121015 | A1 | | 2/2019 | |
| EP | 2793008 | A1 | * | 10/2014 | ............. G01K 15/00 |
| EP | 2793008 | B1 | | 9/2017 | |
| FR | 2582399 | A1 | * | 11/1986 | |
| JP | S63-250540 | A | | 10/1988 | |
| JP | H7-333072 | A | | 12/1995 | |
| JP | H0311430 | A | * | 10/1996 | |
| JP | 2000171310 | A | | 6/2000 | |
| JP | 2002168932 | A | * | 6/2002 | |
| JP | 2004317193 | A | * | 11/2004 | |
| JP | 2009042162 | A | * | 2/2009 | ......... H04N 13/0246 |
| WO | WO-2021247445 | A1 | * | 12/2021 | |

\* cited by examiner

CALIBRATION STRUCTURE FOR CALIBRATING A TEMPERATURE SENSOR AND METHODS THEREFORE

CROSS-REFERENCE TO RELATED APPLICATION

This application claims priority from German Application No. 102018133618.7 filed Dec. 27, 2018, the entire content of which is incorporated herein by reference.

FIELD OF THE INVENTION

The invention relates to a calibration setup for calibrating a temperature sensor having a temperature calibrator into which the temperature sensor can be placed and can be heated to a calibration temperature, and having a temperature measuring unit to which the temperature sensor is connected and by which a measured temperature value can be displayed on a display means of the temperature measuring unit.

BACKGROUND OF THE INVENTION

EP 2 793 008 A1 discloses by way of example a temperature calibrator into which a temperature sensor can be placed and can be heated to a calibration temperature. To heat the temperature sensor, it is inserted into a calibration device that is in turn received in a calibrator block. The temperature calibrator can move to discrete calibration temperatures for the measurement and calibration of the temperature sensor and can maintain them until the temperature sensor has adopted the calibration temperature, with the measured temperature thereupon being displayed on the temperature measuring unit to which the temperature sensor is connected and being read by a user, with the read temperature value being compared with the calibration temperature of the temperature calibrator, for example in ° C. Corresponding deviations then form the calibration value.

A method of calibrating a temperature measuring device is known from DE 10 2018 121 015 A1 having a temperature measuring unit and at least one temperature sensor connectable to the temperature measuring unit and a communication channel is set up between the temperature calibrator and the temperature measuring device so that a calibration value is transmitted from the temperature calibrator to the temperature measuring device by means of the communication channel. The communication channel can be wired or wireless. If the communication channel is wireless, a near field communication, for instance Bluetooth or the like, can be used, for example.

Disadvantageously, not only the temperature calibrator has to be adapted for the setting up of such a communication channel, but the temperature measuring unit must rather have a corresponding interface to set up the communication channel, said interface forming the actual test object together with the temperature sensor. If the temperature calibrator is used with different temperature sensors and associated temperature measuring units, for example in the environment of a laboratory, of a production facility, or of another facility, every temperature measuring unit must be suitable for setting up such a communication channel, that is, must have a matching interface. However, simple, for example handholdable temperature measuring units that, for example, only have a simple display means, must be able to be calibrated by the temperature calibrator having a corresponding calibration setup.

To calibrate a temperature measuring unit in conjunction with the temperature sensor over a wide temperature range, a temperature range has to be moved through as a rule or a plurality of discrete levels of calibration temperatures have to be moved to and, as soon as a corresponding level of a calibration temperature that has been moved to has been reached, a user must read off and document the displayed temperature value on the display means of the temperature measuring unit or must input it in or at the temperature calibrator via a corresponding calibrator indicator display. Consequently, a user has to be present for at least a plurality of points in time for every calibration setup and has to monitor said calibration setup to document the measured calibration temperatures at the different levels, which is time-consuming and thus resource binding in a plurality of calibrations or with a larger number of levels of calibration temperatures that are in particular to be moved to slowly.

SUMMARY OF THE INVENTION

The object of the invention comprises a simplification of a transmission of a calibration value that is displayed on the temperature measuring unit for a further use. The object here in particular comprises an improved calibration setup that serves the calibration of a temperature sensor in conjunction with a temperature measuring unit and in which a user does not have to be permanently present during the calibration process and the moving to different calibration temperature levels to read off the displayed temperature value on a display means of the temperature measuring unit at the correct point in time.

The invention includes the technical teaching that a camera unit is provided and is adapted to detect the temperature value displayed on the display means of the temperature measuring unit and to transfer it to a storage medium.

The central idea of the invention is the use of a camera unit to read the temperature value or values that are displayed on the display means, that is, for example, on a display, of the temperature measuring unit. The camera unit only has to be positioned for this purpose such that the display means can be recorded by the camera unit, whereby a further feature of the calibration setup is formed. The storage medium can here be a component of the camera unit or it is formed separately, for example in the form of a storage unit.

It is in particular of advantage if the storage medium is configured in the temperature calibrator, with the camera unit transmitting the detected temperature value to the storage medium in the temperature calibrator. If the storage medium is integrated in the temperature calibrator, the camera unit transmits the temperature value recorded by the display means so-to-say directly to the temperature calibrator. The temperature value can accordingly be stored in the temperature calibrator, in particular in the storage medium. If a plurality of temperature values are read, corresponding with different levels of calibration temperatures, a plurality of temperature values can also be stored in the storage medium and thus in the temperature calibrator. The storage of the temperature values can in particular be associated with a temperature sensor and/or with a temperature measuring unit, in particular to document the calibration history of the temperature sensor or of the temperature measuring unit, in particular in the temperature calibrator.

The camera unit is particularly advantageously configured for the recording of photos and/or for the recording of videos of the display means so that the temperature values can be transmitted to the storage medium by means of one or more photos or by means of one or more videos. A photo can thus be taken during the calibration when, for example, a first, second, or further level of the calibration temperature has been moved to and the display means can be detected on the photo such that the temperature value can be read off from the photo and in the same manner also from the video, with the photo and/or the video also being able to be displayed, for example, on an indicator display of the calibrator, in particular corresponding to the level of the calibration temperature moved to, after the transmission to the storage medium. On the one hand, the calibration value can thus be read or determined in a simple manner and a documentation can take place, in particular associated with a temperature measuring unit and/or with a temperature sensor.

When the camera unit is connected to the temperature calibrator, for example, a signal can be output from the temperature calibrator to the camera unit, in particular only to record the photo or the video, e.g. as a brief sequence, at the required point in time. The point in time is present, for example, when a level of a calibrating temperature is reached or has been maintained after a holding time.

There is the possibility within the framework of a further development of the invention that the camera unit has an electronic camera and in particular additionally an image processing unit by means of which the temperature value displayed on the display means can be determined as an electronic numerical value and this electronic numerical value can be output by the camera unit and can in particular be transmitted to the storage medium.

The imaging processing unit can here also be a component of the storage medium, in particular integrated in the temperature calibrator. The display means, that is, for example, the display on the temperature measuring unit, is photographed by the electronic camera or a video sequence is produced and subsequently the numerical value displayed on the display means is detected via the image processing unit and is correspondingly transmitted to the storage medium. The detection of the numerical value of the temperature by the image processing unit that has already taken place is additionally also conceivable and simultaneously the transmission of the recorded photo or of the recorded video sequence, in particular as part of a more comprehensive documentation.

The temperature calibrator typically has a calibrator indicator display and in a further embodiment the photo and/or the video and/or in particular the detected temperature value is/are displayed in accordance with the invention in the form of a numerical value on the indicator display of the calibrator known per se. The display can in particular take place in correlation with the calibration temperature, for example such that the calibration temperature moved to is simultaneously displayed to an observer of the photo or of the temperature value already recognized from the photo so that a calibration value can be directly derived therefrom.

It is also conceivable that the camera unit is configured as a camera unit of a smartphone or of a portable tablet PC. In the simplest case, a user can position a smartphone in front of the display means of the temperature measuring unit and wired or wireless communication with the storage medium, in particular together with the temperature calibrator, can be set up via an app and the app generates a photo via the camera on the smartphone at the required time, in particular when the level of the calibration temperature has been reached, said photo finally being transmitted to the storage medium. The photo or the numerical value of the temperature read out by the image processing unit is subsequently displayed on the calibrator indicator display. The communication between the smartphone and the temperature calibrator takes place, for example, via Bluetooth or via another near field communication.

The invention is further directed to a method of operating a calibration setup for calibrating a temperature sensor, wherein the calibration setup has a temperature calibrator into which the temperature sensor is placed and is heated to a calibration temperature, and wherein the calibration setup has a temperature measuring unit to which the temperature sensor is connected and by which a measured temperature value is displayed on a display means of the temperature measuring unit. The method is in particular characterized in that a camera unit is first provided and a detection of the temperature value on the display means of the temperature measuring unit by the camera unit subsequently takes place and the temperature value is subsequently transmitted from the camera unit to a storage medium.

A plurality of temperature values can in particular be detected by the camera unit and the temperature values are stored in a time associated manner in the storage medium correlating to desired temperatures moved to by means of the temperature calibrator. An operator of the calibration setup can thus start the method and leave the calibration setup; and after a maximum calibration temperature has been reached, that is, on reaching the highest level of the calibration temperature, the calibration can be ended and the user can access all the temperatures of the temperature levels from the storage medium without the operator having to look after the calibration setup during the calibration. The calibrations in particular do not bind any further staff resources by the method in accordance with the invention when a larger number of calibrations has to take place in an application environment.

The method is further characterized in that photos and/or videos of the display means are recorded by the camera unit, with the photos and/or videos being stored in the storage medium correlating with levels of calibration temperatures moved to by means of the temperature calibrator and associated therewith in time. There is also the possibility that the calibration temperatures moved to by means of the temperature calibrator are displayed by a calibrator indicator display of the temperature calibrator associated in time with the temperature values and/or with the photos and/or videos of the display means. A comprehensive documentation that is in particular stored associated with the calibrated temperature measuring unit can in particular take place by means of the recorded photos or videos within the temperature calibrator or at a peripheral location.

Finally, provision is furthermore made in accordance with the invention that the temperature values displayed and detected on the display means are further determined by an image processing unit and are output as digital values to the storage medium for storage and/or are displayed on the calibrator indicator display. The recorded photos and/or videos can, for example, be additionally stored in the storage medium, in particular associated with the temperature measuring unit, for purposes of documentation.

BRIEF DESCRIPTION OF THE DRAWINGS

Further measures improving the invention will be shown in more detail below together with the description of a preferred embodiment of the invention with reference to the Figures. There are shown.

DETAILED DESCRIPTION OF THE INVENTION

Figure 1:
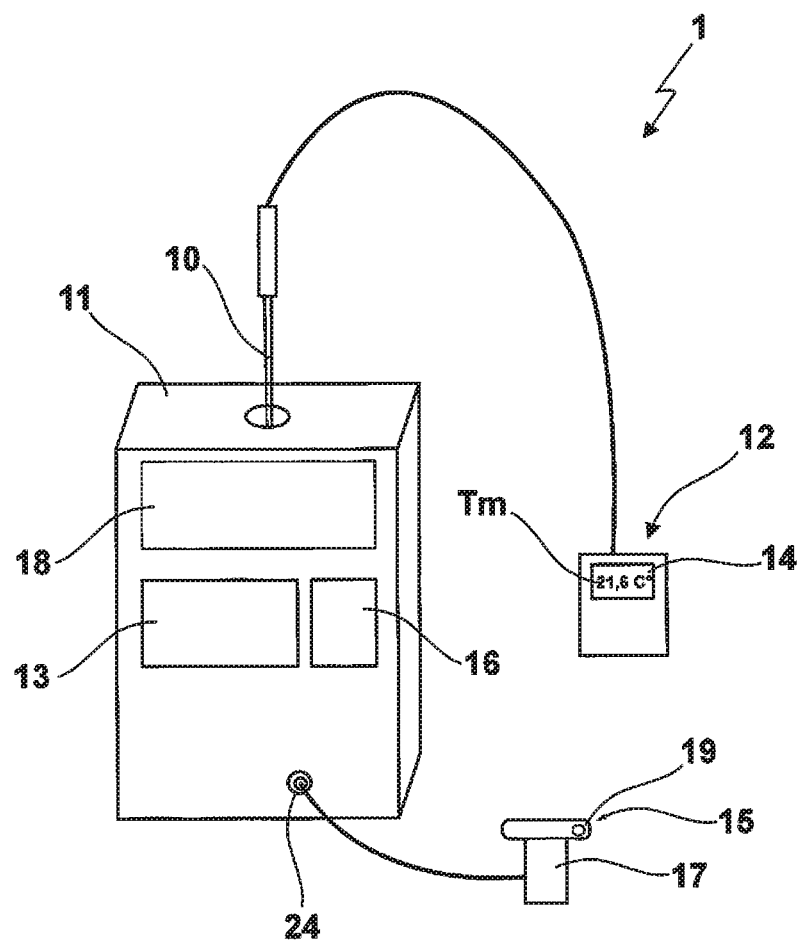
FIG. 1 is a calibration setup for calibrating a temperature sensor with the integration of a camera unit in accordance with the invention.

FIG. 1 shows a schematic view of a calibration setup 1 having a temperature calibrator 11 into which a temperature sensor 10 is introduced. The temperature calibrator 11 heats up the temperature sensor 10 after the start of the calibration to bring it to a calibration temperature. The temperature sensor 10 is connected to a simple temperature measuring unit 12 that is hand holdable, for example, and the temperature measuring unit 12 has a display means 14 on which a temperature value 13 is displayed. Without any deviation, a temperature value 13 is displayed on the display means 14 that corresponds to the temperature level of the moved-to calibration temperature of the temperature calibrator 11.

The temperature measuring unit 12 is configured by way of example, as a hand-holdable small device and a plurality of temperature levels have to be consecutively moved to for the calibration. A camera unit 15 is provided in accordance with the invention to read the display means 14 having the displayed temperature value 13 in a simple manner at the correct points in time of the calibration, that can take some time. The camera unit 15 in accordance with the embodiment comprises an electronic camera 19 and an image processing unit 17.

The camera unit 15 is positioned such that the display means 14 can be photographed or filmed by the electronic camera 19. The photo or the video can subsequently optionally be evaluated by the image processing unit 17 and a temperature value 13 can be transmitted to a storage medium 16. The embodiment shows the storage medium 16 as a component of the temperature calibrator 11 and the storage medium 16 is, for example, integrated in the temperature calibrator 11. The cable connection shown is only to be understood as optional and the transmission of the temperature value 13, that was detected by the camera unit 15, can also be wirelessly transmitted to the storage medium 16, in particular in an arrangement in or at the temperature calibrator 11.

Figure 2:
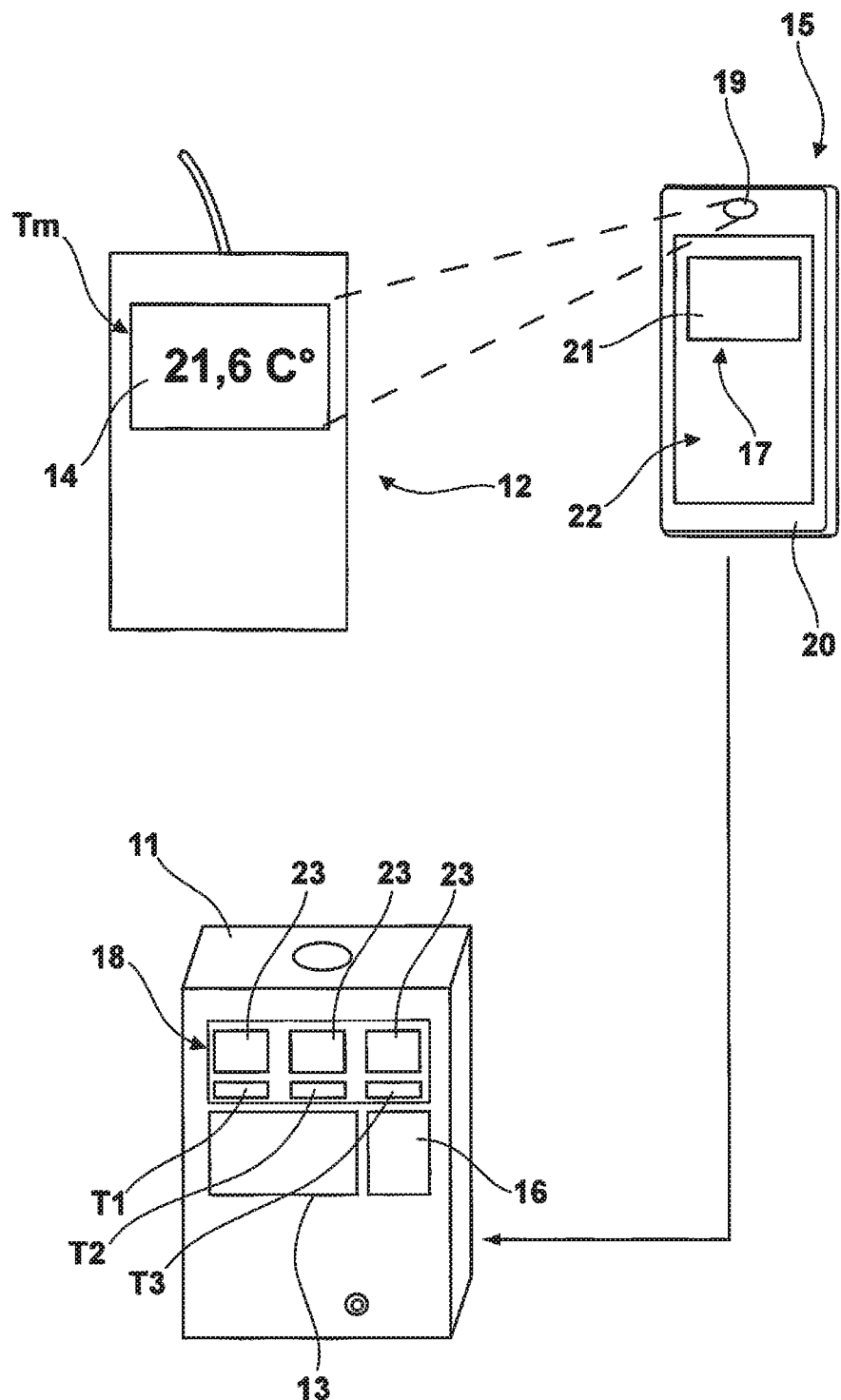
FIG. 2 is a detailed view of the camera unit for recording the display means of the temperature measuring unit and with the temperature calibrator.

FIG. 2 shows a schematic view of the temperature measuring unit 12 with the display means 14 on which a temperature value 13 is displayed. The camera unit 15 is formed by way of example as a smartphone 20 that has an electronic camera 19 in a manner known per se. A piece of application software 21 that can be operated via the display 22 of the smartphone 20 and that is especially designed for the performance of the method in accordance with the invention is installed on the smartphone 20.

The smartphone 20 is positioned relative to the temperature measuring unit 12 such that the temperature value 13 on the display means 14 can be photographed or filmed by the electronic camera 19 on the smartphone 20. The temperature value 13 is subsequently transmitted in a wired or wireless manner to the storage medium 16, which storage medium 16 is located, for example, integrated in the temperature calibrator 11.

The temperature calibrator 11 has a calibrator indicator display 18 on which a plurality of photos 23 are shown by way of example on which temperature values can be read—in a manner not shown in any more detail. In association with the photos 23 that are displayed on the indicator display 18 of the temperature calibrator 11, the respective calibration temperature I, II, and III is displayed in association so that an operator can only read whether deviations are present between the levels I, II, and/or III of the calibration temperature and the temperature value 13 on the display means 14 via the indicator display 18 after the carrying out of the calibration. A corresponding correction can finally take place as part of the calibration. The displayed photos 23 can moreover also be stored in the storage medium 16 in the long term to in particular document a history that relates to the respective temperature measuring unit 12 in correlation with the moved-to levels I, II, III of the calibration temperature and, for example, with a date of the calibration. The measured history of the temperature values 13 can, for example, be accessed again via the photos 23 for the temperature measuring unit 12 on a later, subsequent calibration. The essential advantage is that the operator does not have to wait for the whole duration of the calibration until the required levels of the calibration temperature have been moved to in order finally only to read the measured temperature values 13 on the display means 14 at the brief points in time of the moved-to levels.

Figure 3:
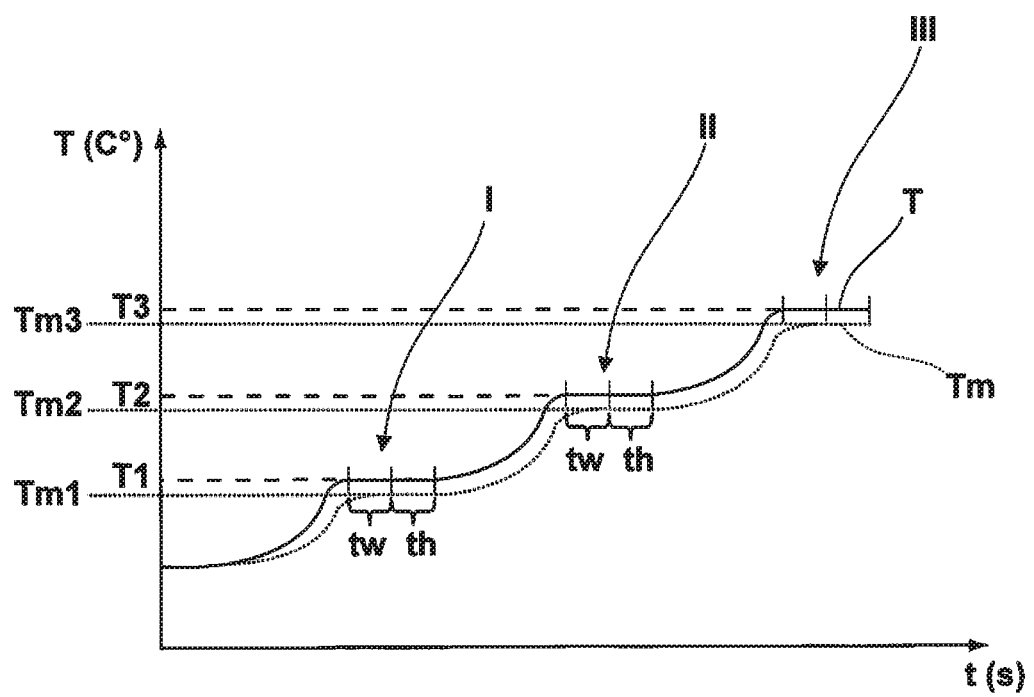
FIG. 3 is a diagram that displays different temperature levels of the calibration temperature over time.

FIG. 3 shows a diagram of the calibration temperature T in ° C. over time in seconds s. The curve shown shows the calibration temperature by the solid line that moves in a cascading manner to a plurality of levels I, II, and III of the calibration temperature T. The dashed line shows the temperature value 13 of the temperature measuring unit 12, with the deviation being shown by way of example such that the extent of the temperature value 13 deviates downwardly from the extent of the calibration temperature T.

The invention is not restricted in its design to the preferred embodiment specified above. A number of variants is rather conceivable that also makes use of the solution shown with generally differently designed embodiments. All the features and/or advantages, including any construction details or spatial arrangements, originating from the claims, the description or the drawings can be essential to the invention both per se and in the most varied combinations.

REFERENCE NUMERAL LIST 1 calibration setup
10 temperature measuring unit
11 temperature calibrator
12 temperature measuring unit
13 control unit
14 display means
15 camera unit
16 storage medium
17 image processing unit
18 calibrator indicator display
19 electronic camera
20 smartphone
21 application software (app)
22 display
23 photo
24 camera interface
T calibration temperature in ° C.
T1 calibration temperature in ° C.
T2 calibration temperature in ° C.
Tm temperature value in ° C.
Tm1 temperature value in ° C.
Tm2 temperature value in ° C.

t time in seconds s
I first level of the calibration temperature
II second level of the calibration temperature
III third level of the calibration temperature

The invention claimed is:

1. A method of calibrating a temperature sensor using a calibration setup, wherein the calibration setup has a temperature calibrator into which the temperature sensor is inserted and is heated to a calibration temperature; wherein the calibration setup furthermore has a temperature measuring unit to which the temperature sensor is connected and by which a measured temperature value (Tm) is displayed on a display means of the temperature measuring unit; and wherein the calibration setup furthermore has a camera unit by which the display on the display means can be recorded; the method comprises at least the following steps:

heating the temperature sensor to a first calibration temperature (T1);
detecting an image of a first temperature value (Tm1) on the display means of the temperature measuring unit by the camera unit;
transmitting the image of the first temperature value (Tm1) from the camera unit to a storage medium in the temperature calibrator;
heating the temperature sensor to at least a second calibration temperature (T2);
detecting an image of a second temperature value (Tm2) on the display means of the temperature measuring unit by the camera unit;
transmitting the image of the second temperature value (Tm2) from the camera unit to a storage medium in the temperature calibrator; and
displaying the first and second temperature values (Tm1, Tm2) on a calibrator indicator display in a respective association with the first and second calibration temperature (T1, T2),
wherein the temperature calibrator has a control unit, with the heating of the temperature sensor to the first and/or second calibration temperature (T1, T2) and the detection of the first and second temperature values (Tm1, Tm2) being carried out by means of the control unit using the following steps:
checking the calibration temperature (T) using a calibration temperature sensor as to whether the calibration temperature (T) in the temperature calibrator has reached a predefined calibration temperature in a substantially stationary manner;
instigating a waiting time (tw) in which the temperature of the temperature sensor is heated to the predefined calibration temperature in a lagging manner;
instigating a holding time (th);
and recording at least one photo of the display means of the temperature measuring unit by activating the camera unit by means of the control unit during the holding time (th).

2. The method in accordance with claim 1, wherein the first and second temperature values (Tm1, Tm2) are stored correlating with the first and second calibration temperatures (T1, T2) in the storage medium of the temperature calibrator.

3. The method in accordance with claim 1, wherein photos of the display means of the temperature measuring unit are recorded by the camera unit, with the first and second temperature values (Tm1, Tm2) being reproduced on the photos.

4. The method in accordance with claim 1, wherein the first and second detected and stored temperature values (Tm1, Tm2) are displayed on the calibrator indicator display of the temperature calibrator by means of the photos recorded by the camera unit.

5. The method in accordance with claim 1, wherein the first and second temperature values (Tm1, Tm2) displayed and detected on the display means are determined by an image processing unit and are output as digital values to the storage medium for storage and/or are displayed on the calibrator indicator display.

6. The method in accordance with claim 1, wherein one or more photos of the display means of the temperature measuring unit are recorded during the waiting time and the first and second temperature values (Tm1, Tm2) are determined and supplied to the control unit by means of the image processing unit.

7. The method in accordance with claim 6, wherein an end of the waiting time is determined by the control unit by means of the first and second temperature values (Tm1, Tm2), with the end then being assumed to have been reached when no change or only a minimal change of the first and second temperature values (Tm1, Tm2) relative to the first or second calibration temperature (T1, T2) is present.

8. A calibration setup for calibrating a temperature sensor, comprising:
a temperature calibrator into which the temperature sensor can be inserted and heated to a calibration temperature (T), the temperature calibrator having a storage medium and a control unit;
a temperature measuring unit connected to the temperature sensor and having a display means for displaying a measured temperature value;
a camera unit configured to detect an image of the measured temperature value displayed on the display means and to transmit the image of the measured temperature value to the storage medium; and
wherein the control unit is configured to carry out the method in accordance with claim 1.

9. The calibration setup in accordance with claim 8, wherein the storage medium is configured such that the camera unit transmits the detected temperature value to the storage medium.

10. The calibration setup in accordance with claim 8, wherein the camera unit is configured to record photos and/or videos of the display means, with the temperature calibrator having a camera interface.

11. The calibration setup in accordance with claim 8, wherein the camera unit has an image processing unit by means of which the measured temperature value displayed on the display means is determined as an electronic numerical value and the electronic numerical value is output by the camera unit and/or is transmitted to the storage medium.

12. The calibration setup in accordance with claim 8, wherein the temperature calibrator has a calibrator indicator display that is configured to display photos detected by the camera unit.

13. The calibration setup in accordance with claim 8, wherein the camera unit is configured as a camera unit of a smartphone or of a portable tablet PC.

* * * * *